F. E. HUIE-LOCKE.
MUSICAL DEMONSTRATING BOARD.
APPLICATION FILED AUG. 3, 1909.
1,058,976.
Patented Apr. 15, 1913.
3 SHEETS—SHEET 2.
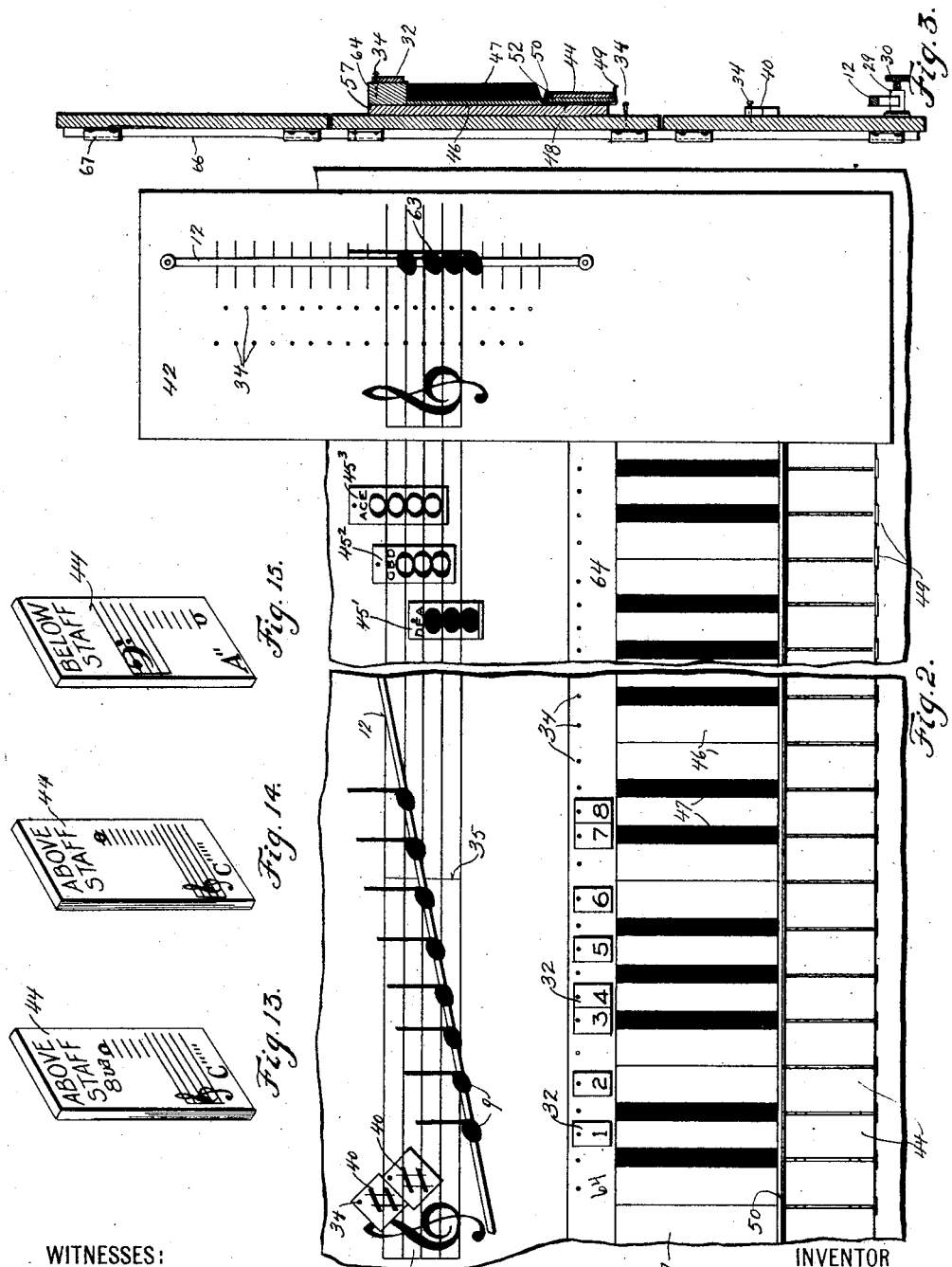

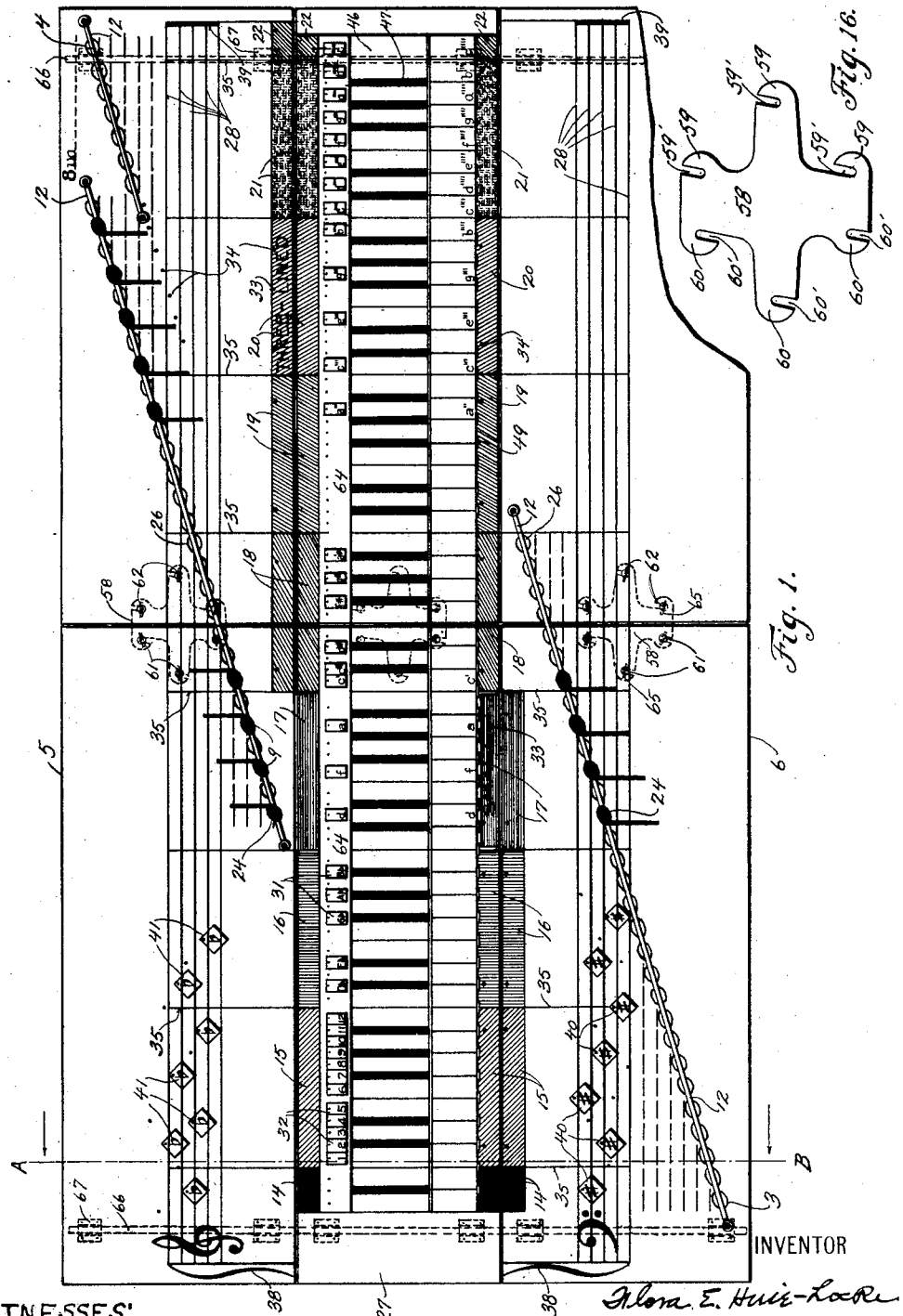

F. E. HUIE-LOCKE.
MUSICAL DEMONSTRATING BOARD.
APPLICATION FILED AUG. 3, 1909.
1,058,976.
Patented Apr. 15, 1913.
3 SHEETS—SHEET 3.
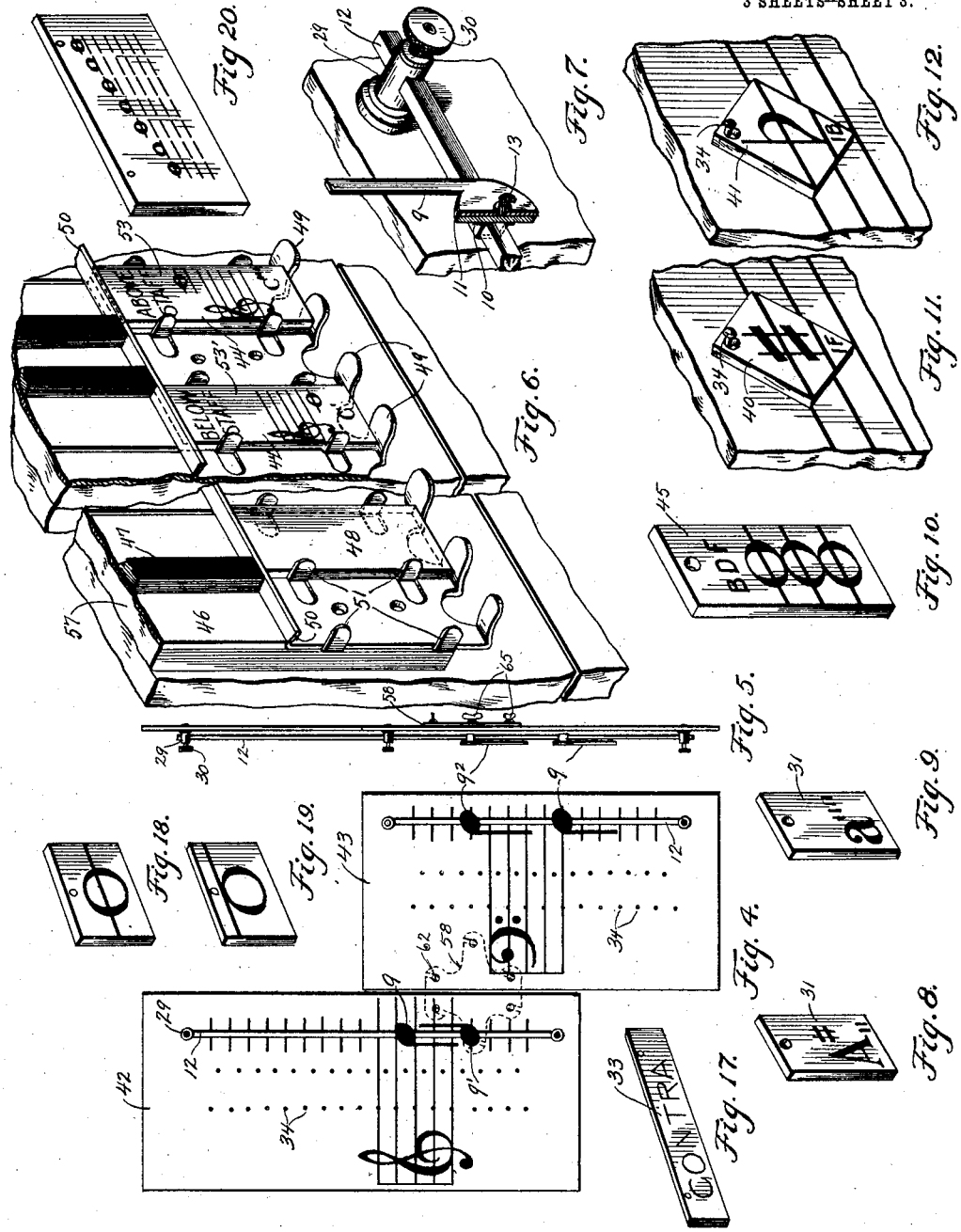
WITNESSES:
INVENTOR
ATTORNEY

UNITED STATES PATENT OFFICE.

FLORA E. HUIE-LOCKE, OF BUFFALO, NEW YORK.

MUSICAL DEMONSTRATING-BOARD.

1,058,976. Specification of Letters Patent. Patented Apr. 15, 1913.

Application filed August 3, 1909. Serial No. 511,053.

*To all whom it may concern:*

Be it known that I, FLORA E. HUIE-LOCKE, a citizen of the United States of America, residing in the city of Buffalo, county of Erie, and State of New York, have invented a certain new and useful Musical Demonstrating-Board, of which the following is a full, clear, and exact description.

My invention relates generally to devices for teaching beginners the fundamental principles of music as applied to the piano.

More particularly it relates to means for demonstrating to pupils "the foundation of music in rhymes and songs" as taught by myself in my *Practical Primary Plan* of instructions for beginners.

In producing my invention I have sought to provide means for demonstrating by practical illustrations, drills and tests, all fundamental ideas pertaining to the arrangement of the piano keys; the names of octaves; number of keys and letters in each octave as well as upon the entire keyboard; the scientific names of each octave together with its complete staff notation and the names of sharps, flats, naturals, etc. I also provide means for scale and triad building; key, signature and interval tests and other useful drills and tests.

Many other advantages resulting from the use of my invention will be evident to those skilled in teaching music, from the accompanying drawings and description.

In the several drawings of this specification like reference characters refer to like parts throughout the several views and in them: Figure 1 is a plan view of my invention. Fig. 2 is a plan view of a part of my demonstrating board with my notation test board attached thereto as used for scale, key and triad drills. Fig. 3 is a sectional view taken on the line A—B of Fig. 1. Fig. 4 is a plan view of my notation test board. Fig. 5 is an edge view of Fig. 4. Fig. 6 is an enlarged detail of my means for holding the key heads in place. Fig. 7 is an enlarged detail of one of my movable notes and means for mounting the same. Figs. 8 and 9 are elevations of my letter tablets. Fig. 10 is an elevation of one of my triad tablets. Figs. 11 and 12 are elevations of my signature sharp and flat tablets respectively, and they also show means for mounting the same on my board. Figs. 13, 14 and 15 are elevations of my key heads showing different notations above and below the staff. Fig. 16 is a detail of the fastening means used for locking some parts of my invention together. Fig. 17 is an elevation of one of my removable octave name tablets. Figs. 18 and 19 are elevations of my supplementary triad tablets. Fig. 20 is an elevation of my supplementary staff tablet.

For convenience in handling and packing I preferably make my demonstrating board in several parts. Preferably the great staff and the keyboard representation are cut in the middle and are adapted when in use to be locked together in the following manner: Near each of the central vertical edges of the parts of my great staff and keyboard representation are bolts 61 and 62 suitably secured to the said parts. Fastening or locking plates 58 provided on each side with lateral flanges 59 and 60 are adapted to pass over the said bolts 61 and 62. Preferably the slots 59' are formed in the upper edges of the flanges 59 and the slots 60' are formed in the lower edges of the flanges 60. One or more of the fastening plates 58 is so placed as to engage with the bolts 61 and 62 on the treble section 5, the bass section 6 and the keyboard representation 27 and thumb-screws 65 are then tightened so as to firmly lock the fastening plates 58 in place. By this means the several parts of the great staff and the keyboard representation may be rigidly locked together.

In addition to the locking means already described, I preferably provide lateral locking means for my demonstrating board. These lateral locking means comprise bars 66 which pass through a series of bar ways formed by the series of bent plates 67. The bars are then locked in position by means of cotter pins or in any other suitable manner. By means of the two locking means just described, my invention is made rigid when in use.

It will be understood that my invention is to be used as a unit in the teaching of music for the purposes already set forth but for the sake of convenience in description I will first describe the great staff and then the keyboard representation.

The great staff comprises a treble section 5 and a bass section 6 which contain all the staff notations of the 7⅓ octave pianoforte from sub-contra A shown at 3 to five-lined *c* shown at 4. The treble section 5 contains the staff notation from *d* shown at 24 to five-lined *c* shown at 4 while the bass section contains the staff notation from sub-contra A shown at 3 to one-lined *b* shown at 26. Thus thirteen notes are shown from *d* at 24 to one-lined *b* on both the treble and bass staffs. The treble and bass sections 5 and 6 may be united in the manner shown in Fig. 1 or they may be joined together without the keyboard representation or both sections may be united above or below the keyboard representation as desired.

The sections 5 and 6 may be enameled white or covered with any suitable white material. The great staff is suitably painted or imprinted upon said sections and the lines 28, suitably spaced apart, run lengthwise of the sections and parallel with the keyboard representation 27. The series of notes like those represented at 3 and 26 may, if desired, be painted or imprinted on the lines and spaces or they may be omitted. When used their office is to indicate the proper positions in which the movable notes 9 may be placed while the latter are moved about during drill work.

Bars or rods 12 (Figs. 1 and 7) may be mounted on posts 29 and locked in position by screw heads 30. Movable notes 9 are preferably secured to sliding sleeves 10 which are adapted to be moved longitudinally along the bars 12. The rests 11 are formed integral with the sleeves 10 and over them the ends of the movable notes move. Preferably each movable note 9 is provided with a pin 13 (Fig. 7) on which may be mounted the letter tablets 31, or the number tablets 32. The said notes 9 may be readily moved along the bar 12 by grasping the pin 13. The notes, being pivotally mounted, may be used with their stems turned upwardly or downwardly as desired.

Strips of different colors are used on the bass and treble sections for distinguishing each octave and a like strip of colors is preferably also used on the keyboard design. Thus black may be used for sub-contra at 14; green for contra at 15; red or cardinal for great at 16; blue for small at 17; pale blue for one-lined at 18; pink for two-lined at 19; pale green for three-lined at 20; yellow for four-lined at 21; and lavender for five-lined at 22. These color strips are made of any suitable width and extend across the upper part of the bass and the lower part of the treble staff sections and at each edge of the keyboard representation.

Within each octave, color octave name tablets 33 may be hung on pins 34 or other suitable supports and these tablets bear the technical names of the several octaves. The octave name tablets 33 may be mounted as desired over their appropriate colors either on the great staff or on the lower edge of the keyboard representation.

Lines of color 35 are drawn perpendicularly across the great staff at the beginning of each octave thus locating the beginning of each octave on the staff. A brace 38 joins the two staffs while a double bar 39 is placed at their ends. The movable notes 9 may be used for scale and triad forming, notation tests and interval drill in ear training work.

The sharps and flats are either painted or imprinted on small tablets which are adapted to be hung on pins 34 or other suitable holders in their respective positions in the signatures. Of course if desired tablets showing double sharps, double flats, natural or cancel signs, may be used but it is unnecessary to here show them.

My notation test board as shown in Fig. 4 is made of a treble section 42 and a bass section 43 and it may be used independently as a test board or it may be separated and either the treble section 42 or the bass section 43 attached to the treble staff 5 (see Fig. 2) when it may be used for triad drill. This notation test board contains all the lines and spaces for the notes found on the great staff perpendicularly arranged so that "the notes that write double" are directly opposite each other; as for example one-lined *c* is the first line $9'$ below treble and the first line $9^2$ above the bass (see Fig. 4). The function of this notation test board is to give notation tests, skipping about the staff, whereby the pupils gain facility and speed in reading notes. It may also be used for triad and interval tests.

In Fig. 2 I have shown a part of the treble staff 5 and the keyboard design 27 as arranged in scale formation. The scale D major is shown in the drawing. The number tablets 32 are preferably set over the keys and if desired the letter tablets 31 of each key may be placed beneath the number tablets. Of course the bass staff may be used in the same way as is the treble staff shown in this figure.

Both the letter tablets and the number tablets are mounted on the pins 34 and during drill work these two kinds of tablets may be shifted and placed upon the movable notes 9. The positions of the number tablets 32 show the positions of whole and half steps. During drill work the key heads 34 are turned with their staff side out. Triads of tonic, shown at $45'$; of sub-dominant, shown at $45^2$; dominant seventh, shown at $45^3$; and the tonic triad, shown at 63 (Fig. 2) are represented as used in the drill work. The signature sharp tablets 40 are placed on the treble staff as clearly shown for use during this drill work. It will be clearly understood that any scale or triads may be found upon this test board.

The triad tablets 45 (Fig. 10) may be made of white keyboard material or any other suitable material. Seven of these triad tablets 45 are used with my rhymes and they are hung on the pins 34 or any suitable holders. Triad drills may be performed with the triad tablets or upon the notation test board by setting the number tablets 32 and the letter tablets 31 opposite the movable notes 9; or such drills may be performed upon the great staff and keyboard representation combined, by demonstrations with movable notes 9, number tablets 32, key heads 44 and letter tablets 31 combined.

The keyboard representation 27 is preferably made of real black and white keyboard material but of course only the surfaces of the keys need be used. The white tail tablets 46 and sharp key tablets 47 are suitably secured to a base 57. Also secured to the base 57 in front of the white tail tablets 46 and sharp key tablets 47, is a metal plate 48 which extends the entire length of the keyboard (Fig. 6). Of course the plate 48 may be, if desired, made up of a number of sections instead of being a continuous plate extending the entire length of the keyboard.

The plate 48 is provided at its rear edge with an upwardly and inwardly inclined flange 50. Lengthwise of the plate 48 I provide one or more series of key head guards 51 which are preferably formed from the plate 48 but of course can be formed in any other convenient manner. The key head guards 51 are spaced so that a key head 44 may be inserted between any two of them. Any desirable number of key head guards 51 may be used but preferably I employ two longitudinal series of them as clearly shown in Fig. 6. At the front of the plate 48 I provide spring flanges 49 which are preferably bowed forwardly. Clearly when the key heads 44 are placed between the flanges 50, the spring flanges 49 and the key head guards 51 they will be held securely in place and at the same time may be readily removed from such position.

In order to make the key heads practically noiseless while in use I preferably provide a felt bushing 52 (Fig. 3) which extends the entire length of the plate 48 and forms a cushion for the key heads.

One side of the key heads 44 may be blank and on the other side may be represented the staff notation. As normally placed the blank faces of these key heads are turned up. Thus in Fig. 6 I have shown at 53 and 53' key head tablets on which staff notations " above staff " and " below staff " respectively are represented. By turning the removable key heads 44 thus showing the notation of any key as desired, many drills in notation searching for notes are made possible. Of course the staff is hidden from view except when the teacher wishes to use it. Thus when, in connection with any particular drill or rhyme work, it is desired to show the staff for the first five lines above, the key heads 44, showing that part of the staff, are placed with their staff side facing up while all the other key heads 44 are placed with their blank sides facing up. By this means much confusion is avoided and a great advantage is gained over a device where the complete staff is shown all the time. The key-board is provided with thirteen extra key heads, which may be adjusted to the key-board, from small $d$ to one-lined $b$. These adjustable key heads bear the staff including the leger lines and spaces below the treble and above the bass.

The letter tablets 31, the number tablets 32, the sharp tablets 40 and the flat tablets 41 are preferably made of white material and they are all adapted to be hung in the positions already described on pins 34. It is to be understood of course that the sharps and flats may be made of metal and hung on pins 34 or in any other suitable way instead of being painted or imprinted upon the tablets as hereinbefore shown and described. The number tablets 32 are adapted to be hung over their respective keys the entire length of the keyboard and they show the number of keys and half steps in an octave as well as the chromatic half steps. These tablets are also used for scale work and for numbering the lines and spaces as well as in triad building either over the keys or on the movable notes. The scientific octave marking is placed on each letter tablet, $e. g.$ A'' for sub-contra and A' for contra. A ledge 64 raised to the level of the sharp key surfaces 47 is provided on the keyboard representation 27 and upon this the notes and letter tablets are hung. The ledge 64 is preferably covered with felt or other similar material thus making the use of the tablets substantially noiseless when they are shifted about during drill work.

As previously indicated the number and letter tablets may be transferred to and hung upon the movable notes on the great staff when notation, interval, scale or triad drills are performed.

When in use my demonstration board complete is hung upon the wall or upon an easel and is entirely independent of the piano since all drills are perfect on it alone. My invention is not a dumb piano but is used for the purpose of demonstrating in tests and drills, thus illustrating the fundamental principles of music.

By means of my invention the fundamental principles pertaining to the keyboard arrangement, the names of letters, sharps, flats, naturals, and the notation of the keyboard can be thoroughly taught and the pupils will gain a greater facility in musical thought than is gained by means of ordinary methods. Moreover my invention provides means whereby the pupils may gain in the beginning of their studies great accuracy in the knowledge of all scales, intervals, triads, signatures and names of musical science such as cleffs, brace, double bars, sharps, flats, triads, etc., when it is used in conection with my ryhmes.

Having thus described my invention what I claim is:

1. In a musical demonstrating board the combination with a key-board representation; of a staff board bearing the complete staff notation of the modern piano key-board and provided with a great staff and all the leger lines above and below both the treble and bass staffs, said staff board being removably secured to said key-board representation and the lines of said staff running parallel with the length of said key-board representation, and movable notes mounted on said staff so that they may be moved into any desired positions with relation to said staff.

2. A musical demonstrating board comprising a staff board bearing the complete staff notation for the modern piano key-board and provided with a great staff and all the leger lines above and below both the treble and bass staffs, a bar secured across the lines of said staff and notes bodily movable and pivotally mounted on said bar.

3. A musical demonstrating board comprising a staff board bearing the complete staff notation for the modern piano key-board and provided with a great staff and all the leger lines above and below both the treble and bass staffs, a bar secured across the lines of said staff, movable notes mounted on said bar, pins carried by said movable notes and letter tablets and number tablets capable of being removably mounted on said movable notes.

4. In a musical demonstrating board the combination with a key-board representation and a board bearing the great staff; of means for locking said key-board representation and said board bearing the great staff, together, comprising a plate, laterally slotted flanges carried by said plate, bolts carried by said key-board representation and said great staff which are adapted to engage the slots in said flanges and means for locking said bolts and said plate together.

5. In a musical demonstrating board the combination with a key-board representation and a board bearing the great staff; of means for locking said key-board representation and the board bearing the great staff together, comprising bars, plates provided with bar-ways secured to said key-board representation and the board bearing the great staff, and means for locking said bars after they have been passed through said bar-ways.

6. A musical demonstrating board comprising a key-board representation, a board bearing the great staff, and removable locking means for uniting said key-board representation and said board bearing the great staff, said key-board representation comprising a base, key-tail tablets secured to said base, sharp key tablets secured to said base, a metal plate secured to said base in front of said key-tail tablets and said sharp key tablets and provided with front and rear flanges and removable key heads adapted to be engaged by the flanges of said plate.

7. A musical demonstrating board comprising a key-board representation, a board bearing the great staff and removable locking means for uniting said key-board representation and said board bearing the great staff, said key-board representation comprising a base, key-tail tablets secured to said base, a metal plate secured to said base in front of said key-tail tablets and said sharp key tablets and provided with front and rear flanges, a felt bushing covering said plate and removable keyheads adapted to be engaged by the flanges of said plate.

8. A musical demonstrating board comprising a key-board representation, a board bearing the great staff and removable locking means for uniting said key-board representation and said board bearing the great staff, said key-board representation comprising a base, key-tail tablets secured to said base, sharp key tablets secured to said base, a metal plate secured to said base in front of said key-tail tablets and said sharp key tablets, an inwardly bent rear flange on said plate, a series of spring flanges arranged along the front edge of said plate and a series of key heads adapted to be removably engaged by said rear flange and said spring flanges of said metal plate.

9. A musical demonstrating board comprising a key-board representation, a board bearing the great staff and removable locking means for uniting said key-board representation and said board bearing the great staff, said key-board representation comprising a base, key-tail tablets secured to said base, sharp key tablets secured to said base, a metal plate secured to said base in front of said key-tail tablets and said sharp key tablets, an inwardly bent rear flange on said plate, a series of spring flanges arranged along the front edge of said plate a series of key heads, guards carried by said plate and spaced apart the width of the key-heads, and a series of key heads adapted to be removably engaged by said rear flange, said spring flanges and said key head guards of said plate.

10. A musical demonstrating board comprising a key-board representation, a board bearing the great staff and removable locking means for uniting said key-board representation and said board bearing the great staff, said key-board representation comprising a base, key-tail tablets secured to said base, sharp key tablets secured to said base, a metal plate secured to said base in front of said key-tail tablets and said sharp key tablets, an inwardly bent rear flange on said plate, a series of spring flanges arranged along the front edge of said plate, a felt bushing secured to said plate and a series of key heads adapted to be removably engaged by said rear flange and said spring flanges of said metal plate.

11. A musical demonstrating board comprising a key-board representation, a board bearing the great staff and removable locking means for uniting said key-board representation and said board bearing the great staff, said key-board representation comprising a base, key-tail tablets secured to said base, sharp key tablets secured to said base, a metal plate secured to said base in front of said key-tail tablets and said sharp key tablets, an inwardly bent rear flange on said plate, a series of spring flanges arranged along the front edge of said plate, a series of key head guards carried by said plate and spaced apart the width of the key heads, a felt bushing secured to said plate and a series of key heads adapted to be removably engaged by said rear flange, said spring flanges and said key head guards of said plate.

12. A musical demonstrating board comprising a key-board representation, a board bearing the great staff and removable locking means for uniting said key-board representation and said board bearing the great staff, said key-board representation comprising a base, key-tail tablets secured on said base, sharp key tablets secured to said base, key heads adapted to be removably secured to said base in front of said key-tail tablets and said sharp key tablets, a raised ledge at the rear of said key-tail tablets and said sharp key tablets, and letter tablets removably mounted on said raised ledge.

13. A musical demonstrating board comprising a key-board representation, a board bearing the great staff and removable locking means for uniting said key-board representation and said board bearing the great staff, said key-board representation comprising a base, key-tail tablets secured on said base, sharp key-tablets secured to said base, key heads adapted to be removably secured to said base in front of said key-tail tablets and said sharp tablets, a raised ledge at the rear of said key-tail tablets and said sharp key tablets, pins carried by said raised ledge and letter tablets and number tablets adapted to be removably mounted on said pins.

14. A musical demonstrating board comprising a key-board representation, a board bearing the great staff and removable locking means for uniting said key-board representation and said board bearing the great staff, said key-board representation comprising a base, key-tail tablets secured on said base, sharp key tablets secured to said base, key heads adapted to be removably secured to said base, and means in front of said key heads for indicating the octaves represented by said key-board representation.

15. A musical demonstrating board comprising a key-board representation, a board bearing the great staff and removable locking means for uniting said key-board representation and said board bearing the great staff, said key-board representation comprising a base, key-tail tablets secured on said base, sharp key tablets secured to said base, key heads adapted to be removably secured to said base, pins secured to said base in front of said keyheads and octave tablets adapted to be removably mounted on said pins.

16. A musical demonstrating board comprising a key-board representation, a board bearing the great staff and removable locking means for uniting said key-board representation and said board bearing the great staff, said key-board representation comprising a base, key-tail tablets secured on said base, sharp key tablets secured to said base, key heads adapted to be removably secured to said base, pins secured to said base in front of said key-tail tablets and said sharp key tablets, a raised ledge at the rear of said key-tail tablets and said sharp key tablets, and means in front of said key heads and in the rear of said raised ledge for indicating the octaves represented by said key-board representation.

In testimony whereof I have hereunto set my hand in the presence of two witnesses.

FLORA E. HUIE-LOCKE.

Witnesses:
  J. WM. ELLIS,
  ETHEL A. KELLY.

---

Copies of this patent may be obtained for five cents each, by addressing the "Commissioner of Patents, Washington, D. C."